United States Patent [19]
Khan et al.

[11] Patent Number: 5,985,236
[45] Date of Patent: Nov. 16, 1999

[54] AMMONIUM OCTAMOLYBDATE COMPOSITION AND METHOD FOR PRODUCING THE SAME

[75] Inventors: Mohamed H. Khan; James A. Cole, both of Ft. Madison; Timothy G. Bruhl, Wever; Wendell S. Elder, Keokuk; Gary A. Glasgow, Ft. Madison; Vijaykumar M. Wagh, Donnellson, all of Iowa

[73] Assignee: Cyprus Amax Minerals Company, Englewood, Colo.

[21] Appl. No.: 09/094,194

[22] Filed: Jun. 9, 1998

[51] Int. Cl.$^6$ .......................... C01B 13/14; C01G 13/14; C01G 39/00; B01J 23/00

[52] U.S. Cl. .......................... 423/592; 423/606; 423/593; 502/300; 502/305

[58] Field of Search .................................. 423/592, 593, 423/600, 606; 502/300, 305

[56] References Cited

U.S. PATENT DOCUMENTS

| | | |
|---|---|---|
| 1,838,767 | 12/1931 | Iredell . |
| 3,656,888 | 4/1972 | Barry et al. . |
| 3,714,325 | 1/1973 | Bloom et al. . |
| 3,834,894 | 9/1974 | Spedden et al. . |
| 3,848,049 | 11/1974 | Ronzio et al. . |
| 3,899,284 | 8/1975 | Stanley . |
| 3,963,823 | 6/1976 | Kulkarni . |
| 4,046,852 | 9/1977 | Vertes et al. . |
| 4,079,116 | 3/1978 | Ronzio et al. . |
| 4,207,296 | 6/1980 | Nauta et al. . |
| 4,379,127 | 4/1983 | Bauer et al. . |
| 4,382,069 | 5/1983 | Heytmeijer . |
| 4,512,958 | 4/1985 | Bauer et al. . |
| 4,552,749 | 11/1985 | McHugh et al. . |
| 4,612,172 | 9/1986 | Brunelli et al. . |
| 4,724,128 | 2/1988 | Cheresnowsky et al. . |
| 4,762,700 | 8/1988 | Huggins . |
| 5,534,997 | 7/1996 | Schrader . |

FOREIGN PATENT DOCUMENTS 1268595  12/1961  France .

OTHER PUBLICATIONS

Morrison, R. T., et al., *Organic Chemistry*, Allyn and Bacon, Inc., Boston, 3$^{rd}$ ed., p. 37 (1973).

U. S. application No. 08/790, 702 filed Jan. 29, 1997 for Method for the Production of a Purified MoO$_3$ Composition.

*Primary Examiner*—Gary P. Straub
*Assistant Examiner*—Cam N. Nguyen
*Attorney, Agent, or Firm*—Bruce E. Dahl, Esq.; Dahl & Osterloth LLP

[57] ABSTRACT

A novel isomer of ammonium octamolybdate ("AOM") and method for producing the same. A new AOM isomer ("X-AOM") is described which is characterized by a distinctive Raman spectral profile compared with other AOM isomers including α and β-AOM. To produce the novel isomer, ammonium dimolybdate ("ADM") is combined with molybdenum trioxide (MoO$_3$) and water to yield a mixture. When mixing these materials, optimum results are achieved if at least one of the foregoing molybdenum-containing reagents is added in a gradual, non-instantaneous manner so that the selected reagent is not added to the mixture in a single large mass. This gradual delivery procedure, along with a carefully controlled prolonged heating stage (e.g. in excess of 3 hours) contributes to a maximum yield of high purity X-AOM.

1 Claim, 2 Drawing Sheets

AMMONIUM OCTAMOLYBDATE COMPOSITION AND METHOD FOR PRODUCING THE SAME

BACKGROUND OF THE INVENTION

The present invention generally relates to the production of an ammonium octamolybdate composition, and more particularly to the manufacture of a novel and unique ammonium octamolybdate isomer having a number of beneficial characteristics.

Ammonium octamolybdate (hereinafter designated as "$(NH_4)_4Mo_8O_{26}$" or "AOM") is a commercially-useful molybdenum composition which is available in multiple forms or "isomers". Each isomer is characterized by its ability to differentially rotate and otherwise reflect light passing therethrough. In particular, two main isomers of AOM have been isolated and used commercially, namely, (1) the α form ("α-AOM"); and (2) the β form ("β-AOM"). Other isomers also exist including the γ form ("γ-AOM") and the δ form ("δ-AOM"). However, little information is available regarding the γ and δ materials which are mostly generated in very small quantities as by-products and are predominantly theoretical/experimental in nature. Of particular interest from a commercial standpoint is the manufacture of α-AOM which is used as a smoke suppressant in many different compositions including polymeric plastic coating materials for electrical wiring and fiber-optic elements. Representative plastic materials suitable for combination with α-AOM include rigid polyvinyl chloride ("PVC"). The β-AOM isomer is likewise secondarily useful for this purpose although α-AOM is preferred.

In general, α-AOM is traditionally produced by the thermal decomposition of ammonium dimolybdate which shall be designated hereinafter as "$(NH_4)_2Mo_2O_7$" or "ADM". This process occurs in accordance with the following basic chemical reaction:

$$4(NH_4)_2Mo_2O_7 + \text{heat} \rightarrow \alpha\text{-}(NH_4)_4Mo_8O_{26} + 4NH_3 + 2H_2O \quad (1)$$

However, as noted in U.S. Pat. No. 4,762,700 (which is incorporated herein by reference), the foregoing process is characterized by numerous disadvantages including the generation of α-AOM having too large a particle size. As a result, the α-AOM product generated from reaction (1) listed above had to be physically size-reduced using conventional material-handling procedures which resulted in additional production costs and increased manufacturing time.

Another disadvantage associated with the conventional thermal generation of α-AOM involved the production of undesired by-products if the chemical reactants were improperly heated (e.g. over-heated or insufficiently heated according to U.S. Pat. No. 4,762,700). When this situation occurred, the following undesired by-products were generated: (1) ammonium trimolybdate (which is also characterized as "$(NH_4)_2Mo_3O_{10}$ or "ATM") and (2) molybdenum trioxide (also designated herein as "molybdic oxide" or "$MoO_3$"). Since neither of these materials have the important and beneficial smoke-suppressive characteristics of α-AOM as discussed herein, they are undesired in the α-AOM production process. For this reason, the thermal decomposition method outlined above must be very carefully monitored, which again results in greater labor costs, more extensive processing equipment, and increased margins of error.

To overcome these disadvantages, an "aqueous" or "wet" reaction process was developed which is extensively discussed in U.S. Pat. No. 4,762,700 (again incorporated herein by reference). This process basically involves the initial combination of ammonium dimolybdate ("ADM" as previously noted) with water to yield a slurry-type mixture. In a preferred embodiment, about 50–350 grams of ADM are used per liter of water to form the desired mixture. Thereafter, particulate molybdenum trioxide is combined with the ADM-containing slurry, with the molybdenum trioxide having a preferred particle size of about 10–300 microns and a high purity level (e.g. not more than about 0.5% by weight (total) of iron (Fe), potassium (K), copper (Cu), lead (Pb), calcium (Ca), and other impurities.) It is further stated in U.S. Pat. No. 4,762,700 that both of these materials are specifically combined in the stoichiometric proportions set forth in the following basic formula:

$$2(NH_4)_2Mo_2O_7 + 4MoO_3 \rightarrow \alpha\text{-}(NH_4)_4Mo_8O_{26} \quad (2)$$

The initial ADM-containing slurry product used in the reaction listed above may be manufactured in many different ways including but not limited to a combination of water, ammonium hydroxide ("$NH_4OH$"), and molybdenum trioxide. The ADM-containing slurry product can be also derived from "ADM crystallizer mother liquor". Finally, commercially-available, pre-manufactured ADM can be directly combined with water to yield the slurry. Regardless of which process is employed for this purpose, U.S. Pat. No. 4,762,700 states that the molar ratio of ammonia to molybdenum (e.g. [$NH_3$]/[Mo]) in the ADM-containing slurry should be adjusted to a value of 1.00 prior to addition of the particulate molybdenum trioxide so that the resulting α-AOM product is substantially free from undesired impurities including β-AOM, ammonium heptamolybdate, and other non α-AOM compounds.

Regarding β-AOM, this material is again generated as a side product in traditional thermal decomposition methods. While β-AOM also has smoke suppressant properties, α-AOM is generally recognized as being superior for these purposes. Accordingly, β-AOM has only secondary commercial value compared with α-AOM as previously noted.

Further information, data, and other important parameters regarding α-AOM and β-AOM will be presented below from a comparative standpoint in order to illustrate the novelty of the present invention which involves a new AOM isomer. This unique isomer (designated herein as "X-AOM") differs considerably from all other forms/isomers of AOM including but not limited to α-AOM and β-AOM (as well as the γ and δ forms of AOM). As discussed in greater detail below, X-AOM is different from the other listed isomers both structurally and functionally.

In accordance with the information provided herein, α-AOM is traditionally used as a smoke control agent in plastic materials and other related compositions. However, the X-AOM isomer offers a number of benefits compared with traditional α-AOM including more efficient smoke suppression per unit volume and greater stability/uniformity. Furthermore, as confirmed by sophisticated chemical identification techniques (including a process known as "Raman spectral analysis" which will be summarized in further detail below), the claimed X-AOM product is likewise characterized by a novel isomeric structure which differs considerably from the structure of α-AOM and β-AOM. The use of Raman spectral analysis enables the X-AOM product to be clearly identified and distinguished from other isomers of AOM. In addition, X-AOM is produced using a unique manufacturing process which facilitates the generation of this material in a highly-effective and preferential manner on production-scale levels.

For these and other reasons discussed in the Detailed Description of Preferred Embodiments section, the present invention represents a considerable advance in the art of ammonium octamolybdate production. The claimed invention specifically involves (1) the generation of a structurally novel isomeric AOM product which provides many important functional capabilities; and (2) the creation of a specialized manufacturing method which enables the X-AOM product to be produced in high yields with a considerable degree of purity. Accordingly, the present invention is novel, unique, and highly beneficial in many ways as outlined in greater detail below.

SUMMARY OF THE INVENTION

The following summary is provided as a brief overview of the claimed product and process. It shall not limit the invention in any respect, with a detailed and fully-enabling disclosure being set forth in the Detailed Description of Preferred Embodiments section. Likewise, the invention shall not be restricted to any numerical parameters, processing equipment, chemical reagents, operational conditions, and other variables unless otherwise stated herein.

It is an object of the present invention to provide a novel isomer of ammonium octamolybdate ("AOM") and method for producing the same.

It is another object of the invention to provide a novel AOM isomer and method for producing the same in which the isomer is characterized by a unique Raman spectrum (and arrangement of intensity peaks associated therewith) which is entirely distinguishable from other AOM isomers including but not limited to the $\alpha$ and $\beta$ forms of this material.

It is another object of the invention to provide a novel AOM isomer and method for producing the same in which the claimed method is able to generate large quantities of the desired isomer (designated herein as "X-AOM") with a maximum degree of purity and efficiency.

It is another object of the invention to provide a novel AOM isomer and method for producing the same in which the method of interest employs readily-available materials and a minimal number of processing steps.

It is another object of the invention to provide a novel AOM isomer and method for producing the same in which the claimed method facilitates production of the desired isomer in a rapid, operationally-efficient manner with minimal labor requirements.

It is a further object of the invention to provide a novel AOM isomer and method for producing the same in which the claimed method avoids the manufacture of other AOM isomers, thereby resulting in a highly pure X-AOM product.

It is a still further object of the invention to provide a novel AOM isomer and method for producing the same in which the claimed method is further characterized by the use of minimal reagent quantities in order to provide a cost-efficient, highly-effective X-AOM production system.

It is an even further object of the invention to provide a novel AOM isomer and method for producing the same in which the claimed product and method result in a unique composition (X-AOM) which provides improved smoke suppression capacity per unit volume and greater uniformity/purity levels compared with other AOM products (including $\alpha$-AOM).

The claimed invention involves a unique, novel, and previously-unknown isomer of ammonium octamolybdate [$(NH_4)_4Mo_8O_{26}$] which, for the purposes of identification, shall be characterized herein as "X-AOM". Isomers traditionally involve compounds which are different yet have the same molecular formula as discussed in Morrison, R. T., et al., *Organic Chemistry*, Allyn and Bacon, Inc., Boston, $3^{rd}$ ed., p. 37 (1973). From a structural standpoint, individual isomers have a different arrangement and orientation of atoms relative to each other. These dissimilarities typically lead to substantial differences in chemical properties from one isomer to another. Ammonium octamolybdate isomers (particularly the $\alpha$ isomer which is conventionally designated herein as "$\alpha$-AOM") have been employed as smoke suppressants in various materials including electrical and fiber-optic cables produced from polymeric plastics. Upon combustion, plastic materials which employ $\alpha$-AOM therein will generate less smoke compared with compositions which lack any $\alpha$-AOM. The novel isomer claimed herein ("X-AOM") provides superior smoke suppressive behavior per unit volume compared with conventional AOM isomers (including $\alpha$-AOM). The X-AOM isomer therefore offers a considerable degree of utility in many important applications.

The following discussion again constitutes a brief overview of the present invention and its various features (including the unique distinguishing characteristics of X-AOM compared with other AOM isomers). Unless otherwise stated herein, the claimed process shall not be restricted to any numerical production parameters, processing equipment, and reagents used to generate the X-AOM product. The invention in its broadest sense shall therefore be defined in accordance with the claims presented below.

To produce X-AOM in a preferred embodiment, a number of process steps and reagents are employed. However, before a summary of these items is provided, an overview of the distinguishing characteristics of X-AOM relative to the other isomers of ammonium octamolybdate ("AOM") is in order. The X-AOM product is readily characterized (and clearly distinguished from all other forms of AOM) using its unique Raman spectral profile which includes a number of distinctive peaks that are not present in the Raman spectral profiles of other AOM isomers. As outlined in further detail below, Raman spectral analysis basically involves a collection of spectral intensity values which are produced when light obtained from a high-energy source (e.g. a quartz-mercury lamp or argon-ion laser unit) is passed through a substance. Raman spectroscopy is an established analytical technique that provides highly accurate and definitive results. In accordance with the present invention, Raman spectral analysis of the novel X-AOM product yields a unique spectral profile having three (3) main intensity peaks which are distinctive and not present in the spectral profiles of other AOM isomers. These main peaks involve the following values: Peak #1=about 953–955 $cm^{-1}$; Peak #2=about 946–948 $cm^{-1}$; and Peak #3=about 796–798 $cm^{-1}$. The foregoing values are completely distinguishable and absent from the Raman spectral profiles associated with the other main AOM isomers listed above including (1) $\alpha$-AOM [two main peaks]: Peak #1=about 964–965 $cm^{-1}$; and Peak #2=about 910–911 $cm^{-1}$; and (2) $\beta$-AOM [two main peaks]: Peak #1=about 977–978 $cm^{-1}$; and Peak #2=about 900–901 $cm^{-1}$. Regarding the term "main peaks" as used above, this term shall encompass peaks for any given AOM isomer which are not present in the Raman spectral profiles of other AOM isomers. In accordance with this information (which clearly distinguishes X-AOM from the other AOM isomers listed above), the creation of X-AOM represents a new, unique, and significant development in the art of molybdenum technology.

The use of Raman spectral analysis involves the most feasible and practical way of identifying X-AOM, with this method being accurate, repeatable, and subject to minimal error. It is therefore entirely sufficient, enabling, and definitive for the claimed X-AOM isomer to be characterized (e.g. identified) spectrally, particularly using Raman spectral profile techniques. Additional information, along with a detailed overview of the Raman spectral data associated with X-AOM (and other AOM isomers) will be provided below in the Brief Description of the Drawings and Detailed Description of Preferred Embodiments sections.

To manufacture X-AOM with acceptable purity values (e.g. +95% by weight pure) while avoiding the production of other AOM isomers (particularly α-AOM), a unique and specialized procedure for accomplishing this goal will now be summarized. While the specific molecular basis for the preferential production of X-AOM using the claimed process is not entirely understood at this time, a number of process steps are considered to be of primary importance as identified herein.

The first step in producing X-AOM involves initially providing (A) a supply of ammonium dimolybdate (e.g. "$(NH_4)_2Mo_2O_7$" or "ADM"); (B) a supply of molybdenum trioxide (e.g "molybdic oxide" or "$MoO_3$"); and (C) a supply of water (which, in all of the embodiments set forth herein, should be deionized). The molybdenum compositions listed above are commercially available from numerous sources including but not limited to the Climax Molybdenum Company of Ft. Madison, Iowa (USA). However, as indicated in U.S. Pat. No. 4,762,700 (incorporated herein by reference), ADM may be conventionally manufactured in accordance with the following formula:

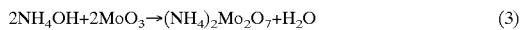
$$2NH_4OH + 2MoO_3 \rightarrow (NH_4)_2Mo_2O_7 + H_2O \quad (3)$$

In the formula listed above (and in the other formulae presented herein), "$NH_4OH$"=ammonium hydroxide. Molybdenum trioxide may also be produced using many alternative processing techniques including the roasting of molybdenum sulfide ("$MoS_2$") to form molybdenum trioxide as indicated in U.S. Pat. No. 4,046,852 or the use of a multi-slurry oxidation process as described in co-owned pending U.S. patent application Ser. No. 08/790,702 filed on Jan. 29, 1997, both of which are incorporated herein by reference. However, this invention shall not be restricted to any particular methods for producing ADM, molybdenum trioxide (or any other reagents set forth herein), with the specific procedures listed in this summary and the Detailed Description of Preferred Embodiments section being provided for example purposes only. Likewise, the term "providing" as used in connection with any given reagent shall encompass (1) adding the reagent in pre-manufactured form obtained from, for example, a commercial supplier; or (2) generating the desired reagent in situ during the production process by combining the necessary ingredients to generate the reagent on-demand, with both methods being considered equivalent.

The compositions listed above are then combined with a supply of water to produce an aqueous chemical mixture. However, three different methods may be employed to generate the aqueous chemical mixture. The first and second methods are related and basically involve initially selecting one of the ammonium dimolybdate ("ADM") and molybdenum trioxide supplies for use as a "first reagent", and thereafter selecting another of the ADM and molybdenum trioxide supplies for use as a "second reagent". Normally, when the material to be used as the first reagent (either ADM or molybdenum trioxide) is initially chosen, selection of the second reagent will involve the material which is "left over" and not used as the first reagent. In a first embodiment of the invention, the first reagent will involve ADM, with the second reagent consisting of molybdenum trioxide. In the second embodiment, molybdenum trioxide will be used as the first reagent, with the second reagent consisting of ADM. The only difference between the first and second embodiments involves the particular materials that are used as the first and second reagents, with the first reagent being added into the system before the second reagent as discussed below.

Once a selection is made as to which compositions will be employed as the first and second reagents, both embodiments are substantially the same. Specifically, the first reagent (either ADM in embodiment number (1) or molybdenum trioxide in embodiment number (2) is initially combined with the supply of water to yield an aqueous intermediate product. The second reagent (either molybdenum trioxide in embodiment number (1) or ADM in embodiment number (2) is then added to the intermediate product in a controlled, gradual, and non-instantaneous manner over time to yield the aqueous chemical mixture.

A third embodiment of the claimed process involves a situation in which the ADM and molybdenum trioxide are combined with the supply of water simultaneously (e.g. both at the same time). The delivery of both materials shall be undertaken in a controlled, gradual, and non-instantaneous manner over time to yield the aqueous chemical mixture. In this particular embodiment, an intermediate product is not generated since all of the reactants are added into the system simultaneously.

It should also be noted that any terminology in the present description which indicates that ADM or molybdenum trioxide is "added", "combined", or otherwise delivered into the system shall again involve the use of these materials in a pre-manufactured form, or the addition of "precursor" compounds which, when combined, react in situ to form the desired reagent(s)/ingredients. Likewise, when the term "combining" is used herein to generally involve mixing of all the listed ingredients to produce the aqueous chemical mixture, this term shall encompass the addition of such materials in any order (and in any manner either gradually or non-gradually) if the order or delivery mode is not specifically designated in the claim or example under consideration.

In accordance with currently available information, a novel feature of the claimed process which, in a preferred embodiment, is currently believed to at least partially contribute (in most cases) to the preferential production of X-AOM over other AOM isomers is the use of a technique which involves "gradual, non-instantaneous" addition of the selected reagent(s) as previously noted. This phrase shall signify a technique in which the composition of interest is not added to the water (or aqueous intermediate product depending on which embodiment is involved) all at once, but is instead delivered in a gradual and progressive manner at a pre-determined rate (e.g. a specific quantity over a designated time period). Controlled and gradual addition may involve (A) continuous delivery of the desired material (s) at a constant and uniform rate over the selected time period; or (B) delivery of the desired material(s) in discrete amounts (e.g. allotments) at periodic intervals over the chosen time period. This particular technique (regardless of which variant is employed) is designed to avoid delivering all of the selected materials(s) into the system at one time in a single large mass. Accordingly, when a particular composition (e.g. ADM, molybdenum trioxide, or both) is selected for delivery in a "gradual, non-instantaneous manner", this phrase shall again encompass any procedure in which the composition is not added into the system all at once, but is instead accomplished over time. While not entirely understood, it is believed that this delivery method creates a complex kinetic environment which promotes the formation of X-AOM in most cases.

The claimed process shall not be restricted to any particular addition rates in connection with chemical compositions that are delivered in a "gradual, non-instantaneous manner". However, to provide optimum results, the "gradual, non-instantaneous" addition of ADM and molybdenum trioxide typically involves a delivery rate of (1) about 75–150 kilograms per minute for ADM; and (2) about 65–130 kilograms per minute for molybdenum trioxide. These rates (which may be varied as needed in accordance with preliminary pilot studies) are applicable to all of the embodiments set forth herein as outlined below.

The invention shall also not be limited to any particular numerical quantities in connection with the supplies of ADM and molybdenum trioxide. It is nonetheless preferred that such materials be employed in the approximate stoichiometric proportions provided by the following chemical reaction:

$$2(NH_4)_2Mo_2O_7 + 4MoO_3 \rightarrow X\text{-}(NH_4)_4Mo_8O_{26} \text{ (or "X-AOM")} \quad (4)$$

However, to achieve optimum results, it has been determined that the use of molybdenum trioxide in a slight excess of stoichiometric requirements (e.g. about 1–5% by weight excess molybdenum trioxide) is preferred.

After formation of the aqueous chemical mixture using any of the techniques listed above, the mixture is thereafter heated to generate a completed reaction product having the X-AOM isomer therein (in solid form). While the claimed method shall not be restricted to any particular heating parameters in connection with the aqueous chemical mixture, it is preferred that the mixture be heated to a temperature of about 85–90° C. over a time period which should exceed 3 hours (e.g. about 3.5–5 hours). Likewise, optimum results are achieved if the aqueous chemical mixture is constantly agitated (e.g. stirred) during the heating process to ensure a maximum yield of X-AOM with high purity values. It is also believed that heating of the aqueous chemical mixture in accordance with the numerical parameters listed above (especially over a time period which exceeds 3 hours) contributes to the preferential generation of X-AOM over other AOM isomers including α-AOM when used with or without the gradual, non-instantaneous addition procedures listed above. However, a combination of both techniques (e.g. gradual, non-instantaneous addition and the time/temperature parameters listed above) provides best results.

After heating as previously noted, the reaction product is optionally (but preferably) cooled to a temperature of about 60–70° C. which is designed to provide additional ease of handling and the further promotion of X-AOM crystal growth. The cooled reaction product is thereafter processed to physically remove the solid X-AOM therefrom. This may be accomplished in many different ways, without restriction to any particular isolation methods. For example, in a preferred and non-limiting embodiment, the X-AOM-containing reaction product can be passed through a selected filtration system one or more times as needed and desired (with or without the use of one or more water-washing steps). The resulting X-AOM product is thereafter dried and collected to complete the reaction process. The final X-AOM composition is characterized by a high degree of purity (+95% by weight X-AOM) and a distinctive Raman spectral profile as outlined below in the Detailed Description of Preferred Embodiments section.

In a still further alternative embodiment of the invention which is designed to produce an X-AOM product with a fine, easily-handled consistency, a supply of previously manufactured X-AOM (e.g. X-AOM generated from the previous production run) is retained and combined with the water, ADM, and molybdenum trioxide at the initial stages of the process. Preferably, a portion of the aqueous chemical mixture discussed above (which contains X-AOM therein) is used for this purpose which provides the foregoing benefits, along with a "seed" function that provides improved X-AOM yield and handleability characteristics by increasing the overall density of the X-AOM. The resulting mixture is then heated as discussed above (e.g. using the above-listed parameters) to yield a reaction product containing additional amounts of X-AOM therein. This particular development is applicable to all of the embodiments set forth herein regardless of whether gradual or non-gradual component addition is employed, and is not limited to any other reaction conditions.

While the claimed method shall not be restricted to any numerical or other parameters (including those listed above unless otherwise stated herein), an exemplary procedure which yields optimum results involves the following steps: (1) providing a supply of ammonium dimolybdate ("ADM"), a supply of molybdenum trioxide, and a supply of water; (2) combining the ADM with the water to produce an intermediate product, with about 283 grams of ADM being used per liter of water; (3) combining the molybdenum trioxide with the intermediate product generated in accordance with step (2) to yield an aqueous chemical mixture, with about 0.87 grams of molybdenum trioxide being used per gram of ADM, wherein this step involves adding the molybdenum trioxide to the aqueous intermediate product in a gradual, non-instantaneous manner (defined above) at a rate of about 110 kilograms of molybdenum trioxide per minute in order to avoid delivering the molybdenum trioxide to the intermediate product all at once; (4) heating the aqueous chemical mixture at a temperature of about 88° C. for a time period of about 4.5 hours to generate a completed reaction product containing the desired ammonium octamolybdate isomer therein (e.g. X-AOM); (5) cooling the X-AOM-containing reaction product to a temperature of about 66° C. after it has been heated in accordance with step [4]; and (6) removing the solid X-AOM composition from the liquid fractions of the reaction product after it has been cooled pursuant to step (5) (e.g. using filtration or other equivalent techniques). Implementation of this procedure results in the highly effective manufacture of X-AOM at purity levels of +95% by weight X-AOM. This purity level reflects the substantial absence of non-X-AOM isomers therein.

In conclusion, the claimed product and process collectively represent an important development in molybdenum technology. The X-AOM composition described above is not only characterized by a unique isomeric structure (which is different from other AOM isomers as demonstrated by Raman spectroscopy), but likewise has improved smoke suppression qualities. The distinctive X-AOM composition is likewise produced in a manner which enables large quantities of X-AOM to be generated with high purity and uniformity levels. These and other objects, features, and advantages of the invention shall be presented below in the following Detailed Description of Preferred Embodiments.

DETAILED DESCRIPTION OF PREFERRED EMBODIMENTS

In accordance with the claimed invention, a novel isomer of ammonium octamolybdate ("AOM") is disclosed which is different in structure and function compared with all other ammonium octamolybdate isomers (including the α, β, γ, and δ forms of this material). The "isomers" of a compound traditionally involve compositions which are different in structural configuration yet have the same molecular formula as discussed in Morrison, R. T., et al., *Organic Chemistry*, Allyn and Bacon, Inc., Boston, 3$^{rd}$ ed., p. 37 (1973). Specifically, individual isomers have a different arrangement and orientation of atoms relative to each other. These dissimilarities can lead to substantial differences in chemical properties from one isomer to another. In the present invention, ammonium octamolybdate has the following basic molecular formula: "$(NH_4)_4Mo_8O_{26}$" which is also known as simply "AOM". The novel isomer associated with the present invention (characterized herein as "X-AOM") involves a different structural configuration compared with all previously-known isomers of AOM including the α and β forms of this material as discussed below and clearly shown in the Raman spectral profiles of FIGS. 2–4. The structural dissimilarities between X-AOM and the other isomers of AOM (α-AOM and β-AOM) are reflected in a number of beneficial attributes associated with X-AOM including improved smoke suppression capacity/performance when the X-AOM composition is employed within, for example, polymer plastic-based electrical and/or fiber optic cable materials (e.g. made of rigid PVC) as previously noted. In particular, it has been determined in certain applications that effective smoke suppression will occur using reduced amounts of X-AOM as an additive within, for example, polymer plastics compared with conventional α-AOM. Likewise, X-AOM is characterized by significant levels of stability and uniformity. Regarding the structural dissimilarities between X-AOM and other AOM isomers, these differences can again be shown in a definitive manner by Raman spectrographic techniques in accordance with specific information provided below.

As a preliminary point of information, the claimed process shall again not be restricted to any particular operational parameters including reagent quantities, the order of reagent addition, reaction conditions, and other numerical values unless otherwise indicated. Specific reaction parameters and other operational factors may be optimized in a given situation (taking into account environmental factors, production-scale requirements, and the like) using routine preliminary pilot testing. The discussion provided below involves one or more preferred embodiments which are designed to provide optimum results and shall not be considered limiting or restrictive.

A. The X-AOM PRODUCTION METHOD

Figure 1:
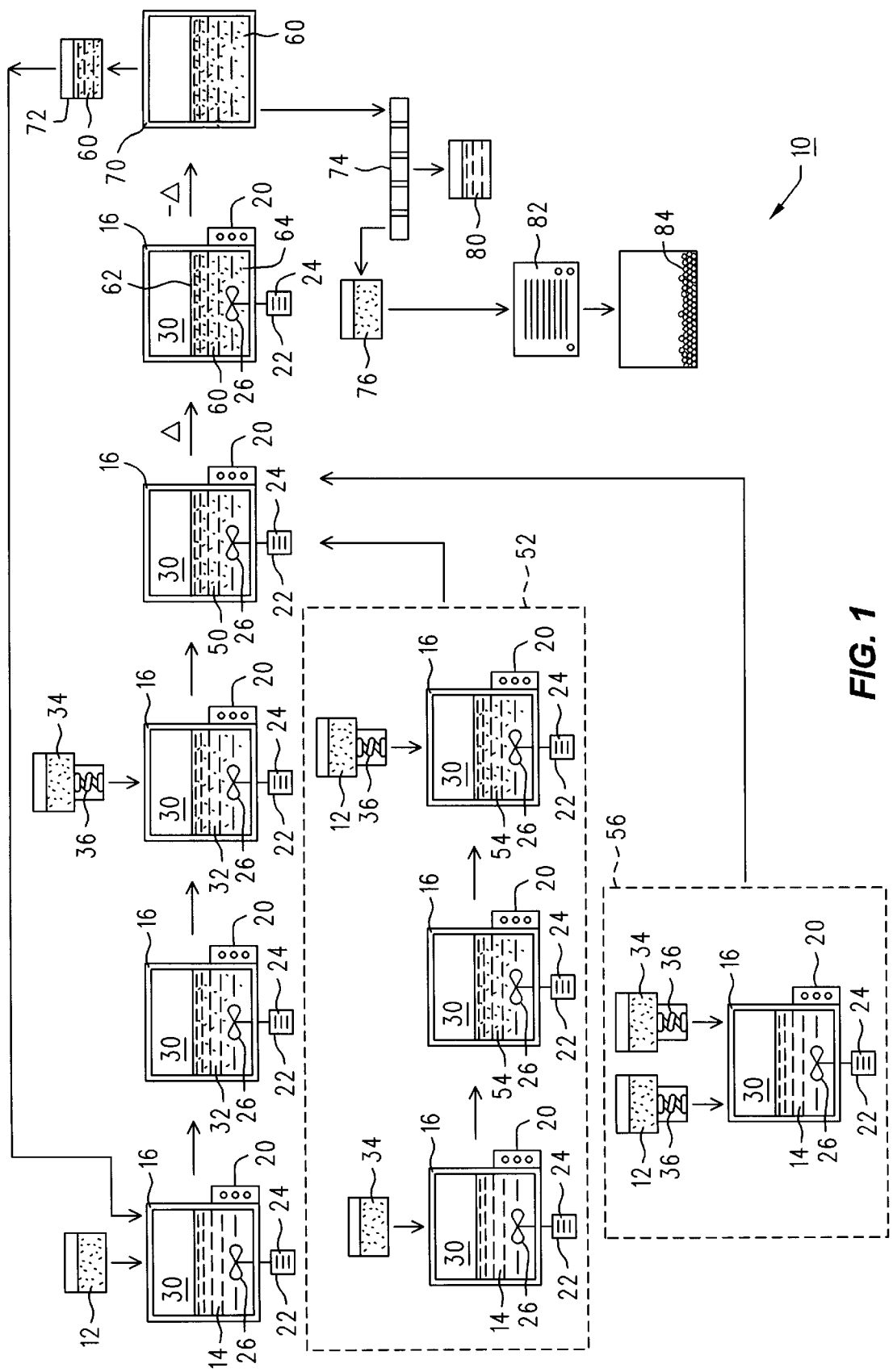
FIG. 1 is a schematic representation of the basic process steps which are employed in a preferred embodiment of the present invention to yield a new and unique isomer of ammonium octamolybdate (e.g. "X-AOM").

With reference to FIG. 1, an exemplary and schematic overview of a process designed to produce the novel X-AOM isomer of the present invention is provided. This process may again be varied as needed based on routine preliminary testing unless otherwise noted. As shown in FIG. 1, the entire processing system is generally represented at reference number 10. Within system 10, a supply of ammonium dimolybdate 12 (also known as "$(NH_4)_2Mo_2O_7$" or "ADM") is initially provided. This composition is commercially available from numerous sources including but not limited to the Climax Molybdenum Company of Ft. Madison, Iowa (USA). However, as discussed in U.S. Pat. No. 4,762,700 (incorporated herein by reference), ADM may be conventionally manufactured in accordance with the following formula:

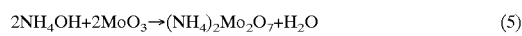

$$2NH_4OH + 2MoO_3 \rightarrow (NH_4)_2Mo_2O_7 + H_2O \tag{5}$$

In the formula listed above (and in other formulae presented herein), $NH_4OH$=ammonium hydroxide and $MoO_3$=molybdenum trioxide. However, the present invention shall not be restricted to any particular methods for producing ADM (or the other reagents set forth herein). As discussed in U.S. Pat. No. 4,762,700, an aqueous solution of ADM which is suitable for use in the claimed process at this stage could likewise be derived from other sources including "ADM crystallizer mother liquor" obtained from commercial ADM manufacturing processes.

In the present embodiment, the supply of ADM 12 shall be designated herein and selected for use as a "first reagent" (e.g. the reagent that is initially added into the system 10). The materials which can be employed in connection with the first reagent may be different in the other embodiments of the claimed process as discussed further below. While all embodiments of the invention shall not be restricted to the use of ADM materials having a particular particle size, it is preferred that a particle size value of about 22–26 microns be employed in connection with the supply of ADM 12 to facilitate proper mixing and dissolution of this material.

With continued reference to FIG. 1, the supply of ADM 12 (again characterized as the first reagent in this embodiment) is then combined with (e.g. added to) a supply of water 14 (optimally deionized) which is retained within a containment vessel 16 produced from a number of possible materials including but not limited to stainless steel, inert plastic (e.g. polyethylene), and the like. It should be noted at this point that any production-scale may be employed in connection with the claimed process. However, in a representative and exemplary embodiment designed for mass-production purposes, the containment vessel 16 will have an optimum capacity of about 20,000–25,000 liters although smaller or larger vessels may be used as desired. All of the remaining process steps associated with the claimed method which are used to produce the desired aqueous X-AOM-containing chemical mixture (discussed below) in each of the embodiments set forth herein can be implemented within the containment vessel 16. However, to ensure rapid processing on a large scale, the multi-vessel configuration specifically shown in FIG. 1 is preferred.

While not required, the supply of water 14 inside the containment vessel 16 may be pre-heated to facilitate immediate dissolution of the ADM 12 (and other materials) in the water 14 during subsequent stages of the reaction process. To accomplish pre-heating, the vessel 16 will include a heating unit 20 associated therewith which may involve many known systems including steam-based, water-flow, electrical-resistance, or hot-water immersion units which are suitable for this purpose. While the process discussed herein shall not be limited to a single pre-heating temperature, optimum results are achieved if the water 14 is pre-heated to about 85–90° C. and maintained at this temperature up to and during the remaining stages of the reaction process as indicated below.

Addition of ADM 12 to the water 14 within the vessel 16 (whether pre-heated or not) is thereafter initiated. The manner in which the supply of ADM 12 is added to the water 14 (e.g. either all at once or in a gradual, non-instantaneous fashion (defined further below) is not critical at this stage, provided that the ADM 12 (e.g. the first reagent) is ultimately dissolved in a substantially complete manner within the water 14. To accomplish this goal, it is preferable to add the supply of ADM 12 to the water 14 in a gradual, non-instantaneous manner to ensure rapid and complete dissolution. A representative, non-limiting addition rate will involve about 75–150 kilograms of ADM 12 per minute. However, as outlined in greater detail below, it is even more important for the second reagent (e.g. molybdenum trioxide in the present embodiment) to be added to the water 14 in a gradual, non-instantaneous manner. It is currently believed that this technique, while not completely understood, beneficially contributes in most cases to the preferential generation of X-AOM over other forms of ammonium octamolybdate (including $\alpha$-AOM).

The phrase "gradual, non-instantaneous addition" as employed herein (relative to all of the listed embodiments) shall signify a technique in which the composition of interest is not added to the water 14 (or any intermediate products depending on which embodiment is involved) all at once, but is instead delivered in a gradual and progressive manner at a pre-determined rate (e.g. a specific quantity over a selected time period). This type of controlled, gradual addition may involve (A) continuous delivery of the desired material(s) at a constant and uniform rate over the designated time period; or (B) delivery of the desired material(s) in discrete amounts (e.g. allotments) at periodic intervals over the chosen time period. The gradual addition of reagents as defined above is designed to avoid delivering all of the selected materials(s) into the system 10 at one time in a single large mass. Accordingly, when a particular material is indicated to be delivered in a "gradual, non-instantaneous manner", this phrase shall encompass any procedure in which the selected reagent is not added into the system 10 all at once, but is instead accomplished over time. While not entirely understood, it is again believed that this gradual addition technique creates a complex and unique kinetic environment which promotes the preferential formation of X-AOM.

It is preferred in all embodiments of the claimed process that the containment vessel 16 be designed to include a stirring system 22 therein (e.g. in the form of a motor 24 operatively connected to a mixing blade 26 positioned within the interior region 30 of the containment vessel 16 and entirely beneath the surface of the water 14 as shown). The stirring system 22 is used to agitate the supply of water 14 and materials added thereto so that complete dissolution of the delivered materials will occur in an efficient manner to produce maximum X-AOM yields.

After addition of the ADM 12 (e.g. the first reagent in this embodiment) to the supply of water 14 within the containment vessel 16, the ADM 12 will rapidly dissolve (especially if agitated as noted above) to yield an ADM-containing solution designated herein as an "aqueous intermediate product" 32. At this point, further information is relevant regarding the amount of the ADM 12 to be employed in producing the aqueous intermediate product 32. While the claimed invention shall not be restricted to any given amounts of added ADM 12 as the first reagent in this embodiment, optimum results will be achieved if about 275–290 grams of ADM 12 are used per liter of water 14. This value may be varied as needed in accordance with preliminary pilot studies involving numerous factors including the desired operating scale of the system 10.

After formation of the intermediate product 32 (e.g. the supply of water 14 having the ADM 12 dissolved therein), a supply of molybdenum trioxide 34 (also known as "molybdic oxide" or "$MoO_3$") is provided. In the present embodiment, the supply of molybdenum trioxide shall be designated herein and selected for use as the "second reagent". The material to be employed in connection with the second reagent may be different in the other embodiments of the claimed process as discussed further below. The supply of molybdenum trioxide 34 can be obtained from many different commercial sources including but not limited to the Climax Molybdenum Company of Ft. Madison, Iowa (USA). Likewise, all of the embodiments described herein shall not be limited to any particular types of molybdenum trioxide (or methods of production). However, best results are achieved if the molybdenum trioxide 34 is of sufficiently high purity to contain not more than about 0.5% by weight (total) of non-molybdenum trioxide materials including iron (Fe), potassium (K), copper (Cu), lead (Pb), calcium (Ca), or other comparable materials in both elemental and compound form. Likewise, in a representative embodiment, the molybdenum trioxide 34 employed at this stage of the manufacturing process will have an exemplary particle size of about 10–400 microns although this value may be varied if needed and desired. Representative production methods which can be employed in connection with the supply of molybdenum trioxide 34 range from the roasting of molybdenum sulfide ("$MOS_2$") to form molybdenum trioxide as discussed in U.S. Pat. No. 4,046,852 to the use of a multi-slurry oxidation process as indicated in co-owned pending U.S. application Ser. No. 08/790,702 filed on Jan. 29, 1997, with both of these documents being incorporated herein by reference.

It should also be noted that any terminology in the present description which indicates that the ADM 12 or molybdenum trioxide 34 is "added", "combined", "provided", or otherwise delivered into the system 10 shall involve the use of these compositions in a pre-manufactured form or the delivery of "precursor" materials which, when added, react in situ to form the desired reagent(s).

While the precise reaction kinetics and molecular interactions associated with the formation of X-AOM over other AOM isomers within system 10 are not entirely understood, is currently believed that the manner in which the molybdenum trioxide 34 (e.g. the second reagent) is delivered into the system 10 in the current embodiment assists in promoting the preferential formation of X-AOM in most cases. The molybdenum trioxide 34 is preferably added to the aqueous intermediate product 32 in a gradual, non-instantaneous manner in accordance with the definition of this phrase provided above. This technique is again employed in order to avoid delivering the supply of molybdenum trioxide 34 to the intermediate product 32 in a single large quantity (e.g. all at once). To accomplish this goal, the molybdenum trioxide 34 may be delivered in a continuous, progressive, and uniform manner over time or in discrete allotments added at periodic intervals. However, in a preferred and non-limiting embodiment, continuous, progressive, and uniform addition of the molybdenum trioxide 34 over a selected time period is employed in order to ensure maximum yields of high-purity X-AOM.

The gradual, non-instantaneous addition of the molybdenum trioxide 34 can be physically accomplished through the use of a standard controlled-delivery conveyor apparatus 36 which may involve a conventional screw-type transfer system or other functionally-equivalent material handling device known in the art for continuous or interval-based material transfer. It should also be noted that the apparatus 36 can be employed for delivering the ADM 12 into the supply of water 14 (if gradual delivery is desired). Likewise, the apparatus 36 may be used to deliver any other reagent into the system 10 in a gradual, non-instantaneous manner when this type of delivery technique is needed and desired.

While the claimed method shall not be restricted to any particular rate at which gradual, non-instantaneous delivery of the molybdenum trioxide 34 may be achieved, it is preferred that such delivery be undertaken at an overall rate of about 65–130 kilograms of molybdenum trioxide 34 per minute. In any given situation, the precise delivery rate associated with the molybdenum trioxide 34 (or any other materials to be transferred in a gradual, non-instantaneous manner as discussed herein) shall again be determined in accordance with routine pre-production testing taking into account the desired production-scale and other related factors. The method described herein (including all embodiments) shall also not be limited to any particular numerical quantities in connection with the supply of molybdenum trioxide 34 (and supply of ADM 12). It is nonetheless preferred that such materials be employed in the approximate stoichiometric proportions provided by the following basic chemical reaction:

$$2(NH_4)_2Mo_2O_7 + 4MoO_3 \rightarrow X\text{-}(NH_4)_4Mo_8O_{26} \text{ (or "X-AOM")} \quad (6)$$

However, to achieve optimum results, tests have demonstrated that the use of molybdenum trioxide 34 in a slight excess of stoichiometric requirements (e.g. about 1–5% by weight excess molybdenum trioxide 34) is preferred. Translated into numerical terms, optimum results are achieved if about 0.85–0.89 grams of molybdenum trioxide 34 are used per gram of ADM 12. Notwithstanding the information provided above, specific reagent quantities to be employed in a given situation are again best determined through routine preliminary testing.

In accordance with the steps provided above in which the water 14, ADM 12, and molybdenum trioxide 34 are all combined, a reaction product is generated which shall be designated herein as an "aqueous chemical mixture" 50. Further treatment of this mixture 50 to obtain X-AOM and other important related information will be provided below.

As previously noted, the aqueous chemical mixture 50 in the present embodiment is produced by (1) combining the supply of water 14 with the ADM 12 which is used as the first reagent to yield the aqueous intermediate product 32; and (2) adding the molybdenum trioxide 34 (as the second reagent) to the intermediate product 32 in a gradual, non-instantaneous manner (defined above) to yield the aqueous chemical mixture 50. While this method is generally preferred and provides highly effective results with minimal labor, other comparable procedures can be employed for producing the aqueous chemical mixture 50. These alternative methods each involve a different order in which the various reagents (e.g. ADM 12 and molybdenum trioxide 34) are delivered into the system 10.

A second embodiment of the invention is shown within dashed box 52 in FIG. 1. As a preliminary note, all of the basic procedures, equipment, operational parameters, and other factors discussed above in connection with the first embodiment (including pre-heating of the water 14 to the previously-listed temperature, agitation of the liquid components in the system 10, and the like) are substantially identical to those used in the second embodiment. The applicability of this information to the second embodiment is confirmed and represented by the use of common reference numbers in both embodiments for the various components of the system 10 including the heating unit 20, the stirring system 22 (consisting of the motor 24 and the mixing blade 26), and the like. Thus, all of the information, data, and techniques discussed above in connection with the first embodiment are incorporated by reference relative to the second embodiment unless otherwise indicated herein. The only substantial difference between both embodiments involves the order in which the supplies of ADM 12 and molybdenum trioxide 34 are added into the system 10 which will now be discussed.

With continued reference to the dashed box 52 in FIG. 1, the supply of molybdenum trioxide 34 is initially combined with the supply of water 14. In the previous embodiment, the ADM 12 was initially added to the water 14, followed by the molybdenum trioxide 34. Thus, the order of component addition associated with the second embodiment is reversed compared with the first embodiment. As a result, the supply of molybdenum trioxide 34 is selected for use as the "first reagent" in this embodiment (since it is being added first), with the supply of ADM 12 being designated for use as the "second reagent". Addition of the molybdenum trioxide 34 to the water 14 may be accomplished either instantaneously (e.g. all at once) or in a gradual, non-instantaneous manner (defined above) at a representative rate of about 65–130 kilograms of molybdenum trioxide 34 per minute. While the particular addition technique used in connection with the supply of molybdenum trioxide 34 as the first reagent shall not be considered critical, gradual, non-instantaneous addition of this material as defined above is preferred in order to ensure rapid and complete dissolution of the molybdenum trioxide 34 within the supply of water 14. In this manner, an aqueous intermediate product 54 is generated (FIG. 1) which involves the supply of water 14 having the molybdenum trioxide 34 dissolved therein. Regarding the amount of the molybdenum trioxide 34 which is used to form the intermediate product 54, the present invention shall again not be restricted any particular quantity values which may be determined by preliminary pilot testing. However, it is preferred that about 240–252 grams of molybdenum trioxide 34 be used per liter of water 14 to achieve maximum X-AOM yields and purity values. Likewise, it should be noted that the intermediate product 54 has been given a different reference number compared with intermediate product 32 in the first embodiment since both products 32, 54 have a different chemical character. Specifically, intermediate product 32 in the first embodiment involves a solution containing dissolved ADM therein, while intermediate product 54 consists of a solution made from dissolved molybdenum trioxide. Regardless of the chemical content of the intermediate products 32, 54, they will both effectively produce the aqueous chemical mixture 50 (although the method of the first embodiment is again preferred for technical, ease-of-use, and solubility reasons).

After formation of the aqueous intermediate product 54 (which contains the supply of water 14 and dissolved molybdenum trioxide 34 therein), the supply of ADM 12 is preferably added to the intermediate product 54 in a gradual, non-instantaneous manner as defined above in order to avoid delivery of the entire supply of ADM 12 to the intermediate product 54 at the same time (e.g. in one large mass). To accomplish this goal, the ADM 12 may be delivered in a continuous, progressive, and uniform manner over time or in discrete allotments added at periodic intervals. In a preferred and non-limiting embodiment, continuous, progressive, and uniform addition of the ADM 12 over a selected time period is employed in order to ensure maximum yields of high-purity X-AOM. The benefits provided by a gradual, non-instantaneous addition of this material are discussed above in connection with the first embodiment and are equally applicable to the second embodiment.

The gradual, non-instantaneous addition of the ADM 12 can be achieved by using controlled-delivery conveyor apparatus 36 discussed above which may again involve a conventional screw-type transfer system or other functionally-equivalent material handling device known in the art for continuous or interval-based material transfer. It should also be noted that the apparatus 36 can be employed for initially delivering the molybdenum trioxide 34 into the supply of water 14 in this embodiment (if gradual delivery is desired). Likewise, the apparatus 36 may be used to deliver any other reagent into the system 10 in a gradual, non-instantaneous manner when this type of delivery technique is needed and desired as indicated above.

While this embodiment of the claimed process shall not be restricted to any particular rate at which gradual, non-instantaneous delivery of the ADM 12 (e.g. the second reagent in the current embodiment) may be accomplished, it is preferred that such delivery be undertaken at an overall rate of about 75–150 kilograms of ADM 12 per minute. In any given situation, the precise delivery rate associated with the supply of ADM 12 (or any other materials to be transferred in a gradual, non-instantaneous manner) shall again be determined in accordance with routine pre-production testing taking into account the desired production-scale and other related factors. The method described herein (including all embodiments) shall also not be restricted to any particular numerical quantities in connection with the supply of molybdenum trioxide 34 (and supply of ADM 12). It is nonetheless preferred that such materials again be employed in the approximate stoichiometric proportions provided by the following basic chemical reaction which was discussed above in connection with the first embodiment and is equally applicable to the second embodiment:

$$2(NH_4)_2Mo_2O_7 + 4MoO_3 \rightarrow X-(NH_4)_4Mo_8O_{26} \text{ (or "X-AOM")} \quad (7)$$

However, to achieve optimum results, tests have demonstrated that the use of molybdenum trioxide 34 in a slight excess of stoichiometric requirements (e.g. about 1–5% by weight excess molybdenum trioxide 34) is preferred. Translated into numerical terms, optimum results are achieved if about 0.85–0.89 grams of the molybdenum trioxide 34 are used per gram of ADM 12 in all of the embodiments described herein.

In accordance with the procedure discussed above and shown schematically in dashed box 52, the aqueous chemical mixture 50 is again generated. The chemical mixture 50 in both of the foregoing embodiments is substantially the same in content, form, and other parameters. The only substantial difference between both embodiments again involves the order in which the supplies of ADM 12 and molybdenum trioxide 34 are added. At this stage in the claimed process, the aqueous chemical mixture 50 produced in accordance with the second embodiment (if used) is further processed in a manner which is common to all of the embodiments provided herein (discussed in greater detail below).

In addition to the first and second embodiments listed above, a still further embodiment (e.g. a third embodiment) may be employed to produce the aqueous chemical mixture 50. The third embodiment is illustrated schematically in dashed box 56 (FIG. 1). It should again be noted that all of the basic procedures, equipment, operational parameters, and other factors discussed above in connection with the first embodiment (including pre-heating of the water 14 to the previously-listed temperature, agitation of the liquid components in the system 10, and the like) are substantially identical to those associated with the third embodiment unless otherwise indicated herein. The applicability of this information to the third embodiment is confirmed and represented by the use of common reference numbers in both embodiments for the various components of the system 10 including the heating unit 20, the stirring system 22 (consisting of the motor 24 and the mixing blade 26), and the like. Thus, all of the information, data, and techniques discussed above in connection with the first embodiment are incorporated by reference relative to the third embodiment. The only difference of consequence between the first, second, and third embodiments again involves the order in which the supplies of ADM 12 and molybdenum trioxide 34 are added into the system 10 as will now be discussed.

The third embodiment shown in dashed box 56 specifically involves a situation in which the supplies of ADM 12 and molybdenum trioxide 34 are both added to the water 14 at the same time, but in a gradual, non-instantaneous manner as defined above. Since the ADM 12 and molybdenum trioxide 34 are both combined with the water 14 in a simultaneous fashion, there are no specific materials designated as first and second reagents in this embodiment. Likewise, no aqueous intermediate products are generated as discussed below. The gradual, non-instantaneous, and simultaneous delivery of ADM 12 and molybdenum trioxide 34 shown in FIG. 1 (dashed box 56) is designed to avoid delivery of the entire supplies of ADM 12 and molybdenum trioxide 34 to the water 14 at the same time (e.g. in one large mass associated with each composition). To accomplish this goal, the supplies of ADM 12 and molybdenum trioxide 34 may be delivered in a continuous, progressive, and uniform manner over time or in discrete allotments added at periodic intervals. In a preferred and non-limiting embodiment, continuous, progressive, and uniform addition of the ADM 12 and molybdenum trioxide 34 over a selected time period is employed to ensure maximum yields of high-purity X-AOM. The benefits provided by the gradual, non-instantaneous addition of these materials are discussed above in connection with the previous two embodiments and are equally applicable to the third embodiment. Likewise, in the third embodiment, the delivery process associated with the supplies of ADM 12 and molybdenum trioxide 34 will both ideally begin at substantially the same time. However, the term "simultaneously" as used in this embodiment shall involve a process in which at least part of the above-listed materials (e.g. ADM 12 and molybdenum trioxide 34) enter the water 14 at the same time, regardless of whether the delivery of one material is started before the other material.

The gradual, non-instantaneous addition of the ADM 12 and molybdenum trioxide 34 in this embodiment can be achieved by using the controlled-delivery conveyor apparatus 36 discussed above which may again involve a conventional screw-type transfer system or other functionally-equivalent material handling device known in the art for continuous or interval-based material transfer. A separate apparatus 36 can be employed for the supply of ADM 12 and the supply of molybdenum trioxide 34 as shown in dashed box 56 of FIG. 1. However, in the alternative, both of these ingredients (the ADM 12 and molybdenum trioxide 34) can be delivered into the water 14 within the containment vessel 16 using a single conveyor apparatus 36 in which such materials are effectively "mixed" during delivery.

While this embodiment of the claimed process shall not be restricted to any particular rate at which gradual, non-instantaneous, and simultaneous delivery of the ADM 12 and molybdenum trioxide 34 may be accomplished, it is preferred that such delivery be undertaken at the following rates: (1) the ADM 12=about 75–150 kilograms per minute; and (2) the molybdenum trioxide 34=about 65–130 kilograms per minute. If a single conveyor apparatus 36 is used to simultaneously deliver both of the above materials, it is preferred that a single delivery rate which falls within both of the above-listed ranges be selected to deliver the combined ADM 12 and molybdenum trioxide 34. However, the precise delivery rate associated with the supplies of ADM 12, molybdenum trioxide 34, or any other materials to be delivered in a gradual, non-instantaneous manner as discussed herein shall again be determined in accordance with routine pre-production testing taking into account the desired production-scale and other related factors. The claimed method (including all embodiments) shall also not be restricted to any particular numerical quantities in connection with the supplies of ADM 12 and molybdenum trioxide 34. It is nonetheless preferred that such materials again be employed in the approximate stoichiometric proportions provided by the following basic chemical reaction which was discussed above in connection with the previous two embodiments and is equally applicable to the third embodiment:

$$2(NH_4)_2Mo_2O_7 + 4MoO_3 \rightarrow X-(NH_4)_4Mo_8O_{26} \text{ (or "X-AOM")} \quad (8)$$

However, to achieve optimum results, tests have demonstrated that the use of molybdenum trioxide 34 in a slight excess of stoichiometric requirements (e.g. about 1–5% by weight excess molybdenum trioxide 34) is preferred. Translated into numerical terms, optimum results are achieved if about 275–290 grams of ADM 12 are used per liter of water 14, with about 0.85–0.89 grams of molybdenum trioxide 34 being used per gram of ADM 12.

In accordance with the procedure discussed above and shown schematically in dashed box 56, the aqueous chemical mixture 50 is again generated, with the subsequent treatment thereof being outlined further below. However, in this embodiment, the combined, simultaneous addition of the supplies of ADM 12 and molybdenum trioxide 34 to the water 14 avoids the generation of any intermediate products and instead directly produces the aqueous chemical mixture 50 as illustrated in FIG. 1. The aqueous chemical mixture 50 in all of the foregoing embodiments is substantially the same in content, form, and other parameters. The only difference of consequence between all of the embodiments again involves the order in which the supplies of ADM 12 and molybdenum trioxide 34 are added into the system 10.

Regardless of which embodiment is employed to produce the aqueous chemical mixture 50, it is believed that the gradual delivery process discussed above contributes to the overall efficiency of the system 10 in generating high yields of the X-AOM isomer in an effective manner. This gradual delivery procedure apparently results in a series of complex kinetic interactions which are not yet entirely understood but enable the X-AOM isomer to be preferably generated (in most situations) over other AOM isomers (including α-AOM). As previously noted, the claimed invention shall not be restricted to any given order in which the ADM 12 and molybdenum trioxide 34 are combined with the water 14, and which of these materials should be added in a gradual, non-instantaneous manner. However, in a process which does not involve adding the ADM 12 and molybdenum trioxide 34 simultaneously as defined above, the composition that is added to the intermediate product 32 or 54 (e.g. the "second reagent") should optimally be delivered in a gradual, non-instantaneous manner to achieve maximum, high-purity yields of X-AOM. Likewise, if the ADM 12 and molybdenum trioxide 34 are delivered to the supply of water 14 simultaneously as discussed above, they should both be added in a gradual, non-instantaneous fashion to obtain best results. Again, it is currently believed that this process maximizes the yield and purity levels of the resulting X-AOM product in most cases.

With continued reference to FIG. 1, the aqueous chemical mixture 50 (regardless of the manner in which it is generated) is thereafter processed to obtain a purified X-AOM product. To accomplish this goal, the aqueous chemical mixture 50 is heated within the containment vessel 16 to further promote maximum X-AOM formation. This particular step can take place within the containment vessel 16 as illustrated in FIG. 1 or, in the alternative, may be undertaken in a separate vessel (not shown) of the same type, size, and construction material as the vessel 16 (depending on the desired scale of the system 10 and other related factors).

The heating process associated with the aqueous chemical mixture 50 in the containment vessel 16 preferably involves heating the mixture 50 to a temperature of about 85–90° C. which is maintained over a time period that preferably exceeds 3 hours (e.g. optimally about 3.5–5 hours). Heating is accomplished in the embodiment of FIG. 1 using the heating unit 20 discussed above. Likewise, optimum results will be achieved if the chemical mixture 50 is constantly agitated (e.g. stirred) during the heating process to ensure maximum yields of X-AOM with high purity values. Agitation may be undertaken using the stirring system 22 which again includes a motor 24 operatively connected to a rotatable mixing blade 26 positioned within the interior region 30 of the vessel 16 (and entirely beneath the surface of the aqueous chemical mixture 50.)

It is also believed that, regardless of whether or not gradual, non-instantaneous delivery techniques are employed, heating in accordance with the particular operational parameters recited herein (especially in excess of 3 hours) contributes to the preferential generation of X-AOM while avoiding the production of other AOM isomers including α-AOM. Again, while the exact isomerization reactions which promote the formation of X-AOM over other AOM isomers are not entirely understood, the specific heating process discussed above (and numerical parameters associated therewith including the heating time exceeding 3 hours) apparently creates a unique chemical environment which promotes X-AOM formation. Optimum results will be achieved if the above-described heating process is used in combination with gradual, non-instantaneous delivery techniques as described herein.

As a result of the heating process, the aqueous chemical mixture 50 is basically converted into a thickened slurry-type composition having solid X-AOM suspended therein which shall be characterized as a "reaction product" 60 schematically illustrated in FIG. 1. The reaction product 60 basically includes (1) a liquid fraction 62 consisting primarily of water derived from the original supply of water 14 along with very small amounts of residual dissolved ADM and/or molybdenum trioxide; and (2) a suspended solid fraction 64 that consists essentially of the desired X-AOM product, the unique characteristics of which will be summarized below. After the heating process is completed, the reaction product 60 is preferably cooled in an optional cooling stage. Cooling in the embodiment of FIG. 1 again optimally occurs within the containment vessel 16 although a separate vessel (not shown) of the same type, size, and construction material as the vessel 16 can be employed for this purpose, depending on the desired scale of the system 10 and other related factors.

Cooling of the reaction product 60 at this stage provides a number of advantages including the promotion of X-AOM crystal formation and growth (which leads to improved handleability characteristics). Cooling of the reaction product 60 inside the containment vessel 16 may occur via the deactivation of heating unit 20 and the natural dissipation of heat over time without the use of external cooling aids or systems. While the claimed invention shall again not be specifically limited to any particular cooling temperatures, optimum results are achieved if the reaction product is cooled to about 60–70° C. which is designed to provide additional ease of handling, further X-AOM crystal growth, and the like. Alternatively (and in a preferred embodiment), the cooling process may be accelerated through the use of an optional cooling unit (not shown) of conventional design associated with the containment vessel 16 and positioned on the inside or outside thereof. Representative systems suitable for use as the cooling unit may include but are not limited to standard chiller coil/refrigeration systems or water cooling devices that are known in the art for the large-scale cooling of industrial fluids. Likewise, if the heating unit 20 is of a type which employs circulating hot water or steam therein to increase the temperature of the containment vessel 16 and its contents, cold water may likewise be routed through the unit 20 for cooling purposes if desired.

After cooling of the reaction product 60 (if desired), the product 60 is optionally transferred out of the containment vessel 16 in the embodiment of FIG. 1 and routed into a temporary storage vessel 70. In a preferred embodiment, the storage vessel 70 is of the same type, size, and construction material as the vessel 16 or otherwise configured as needed. The next step (which is also optional but beneficial in character) involves a procedure in which a portion 72 of the reaction product 60 is routed (e.g. recycled) from the storage vessel 70 back into the initial containment vessel 16 at the beginning of the system 10 as illustrated in FIG. 1. This portion 72 of the reaction product 60 will again include a supply of X-AOM therein from the previous (e.g. prior) processing sequence discussed above. The portion 72 of the reaction product 60 that is transferred back to the vessel 16 functions as a "seed" composition that promotes favorable reaction kinetics within the vessel 16 which lead to improved X-AOM yield characteristics and a more easily handled product with beneficial physical characteristics (e.g. a greater overall density). While the claimed process shall not be restricted to any particular quantity in connection with the recycled portion 72, it is preferred that about 5–15% by weight of the reaction product 60 be used as the portion 72. In systems which do not employ a separate storage vessel 70 as shown in FIG. 1, the "seeding" process outlined above may be accomplished by simply leaving about 5–15% by weight (or other selected amount as needed and desired) of the reaction product 60 within the containment vessel 16 after the majority of the product 60 is removed for subsequent treatment (e.g. by filtration and the like as indicated below). Thus, this aspect of the present invention in its broadest sense involves combining a supply of previously-produced X-AOM (derived from the portion 72) with the ADM 12, water 14, and molybdenum trioxide 34 (regardless of the order and manner of addition [e.g. gradual or non-gradual]) to yield additional supplies of X-AOM having the beneficial physical characteristics listed above. It should nonetheless be emphasized that this "seeding"/recycling stage is optional, with the use thereof being employed in accordance with preliminary routine testing, taking into consideration the particular reaction conditions and production-scale of interest.

Next, the reaction product 60 within the storage vessel 70 is treated to remove/recover the X-AOM-containing solid fraction 64 from the liquid fraction 62. This may be achieved in many different ways, with the present invention not being limited to any particular isolation methods. For example, in a preferred and non-limiting embodiment illustrated schematically in FIG. 1, the slurry-type reaction product 60 containing the liquid and solid fractions 62, 64 is passed through a selected filtration system 74. Many different components and materials can be employed in connection with the filtration system 74. However, representative and non-limiting examples of filtration devices which can be used in connection with the filtration system 74 include but are not limited to vacuum and/or pressure-type filters as discussed further below in the Example section. Other removal devices may also be employed for separating the X-AOM-containing solid fraction 64 from the liquid fraction 62 in the reaction product 60 include conventional centrifuge systems, settling units, cyclones, and the like.

In accordance with the recovery/filtration process shown in FIG. 1 and discussed above, a retentate 76 and a permeate 80 are generated. The retentate 76 involves the isolated solid fraction 64, namely, an X-AOM crystalline product having a representative purity level of about +95% by weight X-AOM. The retentate 76 may optionally be washed one or more times with water if needed and desired. The permeate 80 consists of the liquid fraction 62 which again comprises mostly water and residual dissolved quantities of the various molybdenum-based chemical species used in the system 10. These species include relatively insignificant amounts of dissolved ADM and dissolved molybdenum trioxide. The permeate 80 can either be discarded or further treated to recover molybdenum therefrom. While the recovery/filtration step discussed above is shown only once in FIG. 1, multiple, successive recovery stages can be used if necessary.

The retentate 76 consisting primarily of crystalline X-AOM can then be air dried or preferably dried one or more times (e.g. in single or multiple drying stages) using a conventional oven apparatus 82 illustrated schematically in FIG. 1. While the claimed method shall not be restricted to any given heating systems in connection with the oven apparatus 82, exemplary devices which may be used in connection with the oven apparatus 82 include but are not limited to steam or gas-heated rotary dryer units, spray dryer systems, and combinations thereof. Likewise, the present invention shall not be limited to any specific parameters in connection with the drying process discussed above. However, in an exemplary embodiment, drying of the X-AOM-containing retentate 76 will typically occur at a temperature of about 145–150° C. for a time period of about 60–90 minutes (in a single drying stage). An example of a multiple drying process which may be employed in order to achieve more gradual and controlled drying will be discussed below in the Example section.

The resulting dried composition obtained from the oven apparatus 82 will consist of the final X-AOM product 84 shown in FIG. 1. If needed for particular applications, the X-AOM product 84 may be ground or otherwise size-reduced using conventional grinding systems (not shown). It is desired in most cases for the final X-AOM product 84 to have an average particle size of about 16 microns or less. The X-AOM product 84 (which, again, is typically about +95% by weight X-AOM) may thereafter be stored for future use or otherwise immediately utilized in a variety of important applications including incorporation within various polymeric plastic materials (e.g. electrical or fiber-optic cable coverings made of rigid PVC) as a highly effective smoke suppressant with increased thermal stability. As previously noted, the X-AOM product 84 is able to provide superior smoke suppressant (and flame retardant) characteristics compared with other AOM isomers (including $\alpha$-AOM). For example, tests have shown that X-AOM can offer a greater degree of smoke-suppression per unit volume compared with other AOM isomers such as $\alpha$-AOM. The process discussed above and the resulting X-AOM product 84 therefore represent a considerable advance in the art of molybdenum technology.

In order to provide further information regarding a preferred and enabling process which may be used to yield substantial amounts of X-AOM at high purity levels (e.g. +95% by weight X-AOM), the following Example is provided. It shall be understood that the Example presented below is representative only and is not intended to limit the invention in any respect.

EXAMPLE

In this Example, about 8025 liters of deionized water were initially provided and placed in a containment vessel of the type discussed above having a capacity of about 22,700 liters. Also combined with the water was about 2270 liters of the X-AOM-containing aqueous chemical mixture (defined above) obtained from the previous production run. This material again functions as a "seed" composition as previously noted. A supply of ADM having a particle size of about 22–26 microns was added to the water (and "seed" material) to produce an aqueous intermediate product. Addition of the ADM to the water was undertaken in a gradual, non-instantaneous manner as defined above. Addition of the ADM was accomplished using a screw conveyor apparatus of conventional design. In this Example, about 283 grams of ADM were used per liter of water. This resulted in the use of a grand total of about 2268 kilograms of ADM which were delivered into the water at a rate of about 110 kilograms of ADM per minute.

Thereafter, a supply of molybdenum trioxide having a particle size of about 380 microns was added to the aqueous intermediate product in a gradual, non-instantaneous manner (discussed above) at a rate of about 95 kilograms of molybdenum trioxide per minute. The total amount of molybdenum trioxide used in this Example was about 1973 kilograms (e.g. about 0.87 grams of molybdenum trioxide per gram of ADM). Addition of the molybdenum trioxide was also achieved using a conventional screw conveyor apparatus. As a result of these steps, an aqueous chemical mixture was produced from the water, ADM, and molybdenum trioxide.

Next, while maintaining the aqueous chemical mixture within the containment vessel, it was heated for about 4.5 hours at a temperature of about 88° C. (with agitation as discussed above) to produce a slurry-type reaction product. Thereafter, the reaction product was cooled to about 66° C. within the containment vessel. Cooling was accomplished through the use of a conventional water-based cooling coil system associated with the containment vessel and in physical contact therewith in which cooling water (at a temperature of about 23° C.) was transferred therethrough. Cooling occurred over a time period of about 60 minutes. The cooled reaction product which contained the solid X-AOM composition of interest therein was then routed into a separate pre-filtration storage vessel.

After transfer of the cooled reaction product to the storage vessel, about 10% by weight of the cooled reaction product was sent back into the initial containment vessel to act as a "seed" formulation for the enhanced production, generation, and growth of X-AOM crystals in subsequent production runs which will again improve the handleability of the X-AOM product by increasing its overall density. Next, the cooled product was routed into a filtration system which, in this Example, involved a pressure-based filter unit of a type obtainable from numerous suppliers including the Larox Corporation of Patuxent Woods Drive, Columbia Md. (USA). Filtration occurred over a time period of about 24 hours (to process the complete amount of material which was recovered/filtered in individual batches).

The resulting filtered product (consisting of X-AOM) was then directed into a conventional continuously-operating rotary primary drying apparatus heated by natural gas (or steam) to a temperature of about 140° C. over a time period of about 1 hour (making certain that the temperature did not exceed about 230–250° C. which can result in thermal decomposition of the desired materials.) Thereafter, the dried X-AOM was reduced to a particle size of about 150 microns or less using a material handling apparatus suitable for this purpose (e.g. a hammermill), followed by transfer of the size-reduced X-AOM into a secondary drying apparatus (e.g. of a conventional vertical type which is obtainable from many different sources including the Wyssmont Co., Inc. of Fort Lee, N.J. (USA) under the trademark "TURBO-DRYER".) Within the secondary drying apparatus, the X-AOM was heated to a temperature of about 110° C. over a time period of about 1 hour. The dried X-AOM was then subjected to additional grinding/size reduction in a primary grinding unit (e.g. a mill/grinding system of a type obtainable from many sources including Hosokawa Micron Powder Systems of Summit, N.J. [USA] under the trademark "Mikro-ACM") so that the X-AOM product was further size-reduced to a particle size not exceeding about 30 microns.

Finally, after treatment in the primary grinding unit, the particulate X-AOM was further dried in a tertiary drying apparatus (e.g. of the same type as employed in connection with the secondary drying apparatus listed above) at about 110° C. for a time period of about 3 hours to yield the final X-AOM product. This product was further size-reduced in a secondary grinding unit of the same type as the primary grinding unit listed above to a particle size of about 16 microns or less.

Again, the claimed method shall not be restricted to the parameters, equipment, processing sequences, and other information set forth in this Example which are provided for informational purposes.

B. CHARACTERISTICS OF THE COMPLETED X-AOM PRODUCT

As previously noted, the X-AOM composition of the present invention has a unique isomeric configuration which differs substantially from that of other AOM isomers including $\alpha$-AOM and $\beta$-AOM (as well as the $\gamma$ and $\delta$ forms of AOM). The X-AOM product is readily characterized (and clearly distinguished from other forms of AOM) using its unique Raman spectral profile. Raman spectroscopy basically involves the collection of spectral intensity values which result when light obtained from a high-energy source (e.g. a quartz-mercury lamp or argon-ion laser unit) is passed through a substance. Raman spectroscopy is an established analytical technique that provides highly accurate and definitive results. In accordance with the present invention, Raman spectral analysis of the novel X-AOM product results in a distinctive spectral profile which is entirely different from the spectral profiles of other AOM isomers. Raman spectroscopy specifically provides detailed covalent chemical bonding information, and likewise graphically illustrates medium and long range order modes in connection with the compounds being analyzed. Further general information concerning Raman spectroscopy is provided in U.S. Pat. No. 5,534,997 which is incorporated herein by reference. The use of Raman spectral analysis represents the most feasible and practical way that is currently known for the identification of X-AOM, with this method being accurate, repeatable, and subject to minimal error. It is therefore entirely sufficient, enabling, and definitive for the novel X-AOM isomer to be claimed and characterized (e.g. identified) spectrally, particularly using Raman spectral analysis. Basically, the presence of intensity peaks in one spectral profile which do not appear in other spectral profiles supports the existence of a different and distinctive compound (X-AOM in this case).

To confirm the distinctive character of X-AOM, its Raman spectral profile was compared with the Raman spectral profiles obtained from α-AOM and β-AOM. Many different Raman spectral analyzers may be used with consistent results. Accordingly, analysis of the X-AOM product using Raman spectroscopy shall not be restricted to any particular analyzing equipment. For example, Raman spectral analysis services suitable for use in identifying X-AOM are available from many commercial enterprises including Namar Scientific, Inc. of McKeesport, Pa. (USA) which employs a Model 1000 Raman Spectrometer produced by the Renishaw Company of Schaumburg, Ill. (USA). This particular system uses a 514.5 nm (2 mW) argon-ion laser excitation source, with a 1800 groove/mm grating that allows a 1.5 cm$^{-1}$ spectral resolution. A spectral region of 100–4000 cm$^{-1}$ is utilized, with detection/analysis being accomplished using a −70° C. Peltier-cooled CCD detector. A microscope having 10×, 20×, and 50× objectives is ultimately employed to collect scattered radiation obtained from the laser-illuminated samples, with the scattered radiation thereafter being directed into the Raman spectrometer described above. Notwithstanding the availability of this particular system for testing purposes involving X-AOM, the claimed invention shall not be restricted to any particular Raman-type analytical equipment, with many different systems and configurations providing equivalent results.

Figure 2:
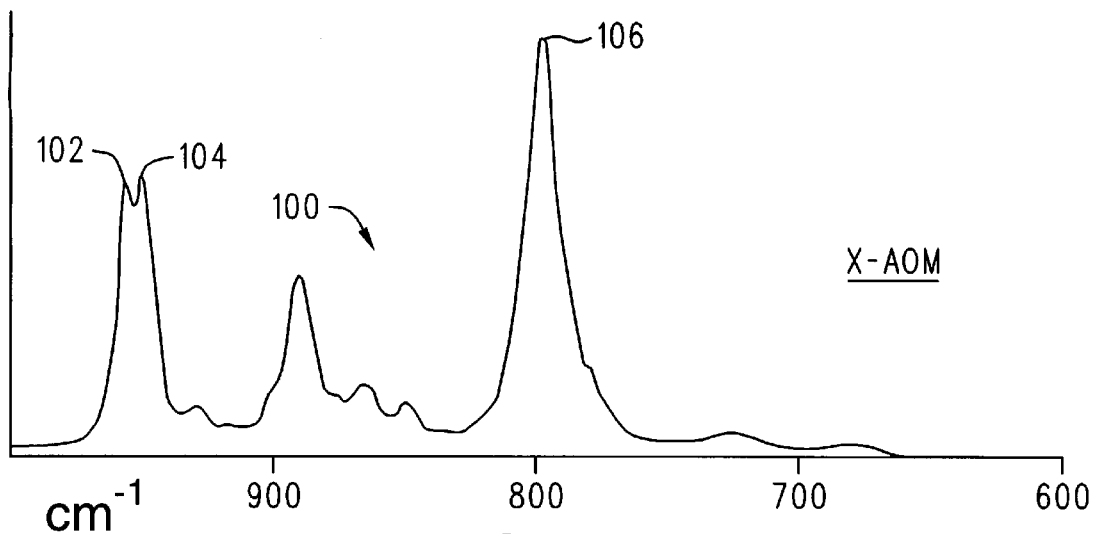
FIG. 2 is a Raman spectral profile of the novel X-AOM isomer claimed herein.

With reference to FIG. 2, a Raman spectral profile 100 of the X-AOM product is provided. At the outset, it is important to note that the various peaks which are not identified or otherwise discussed in connection with the profiles of FIGS. 2–4 involve other species, phases, and/or by-product molybdates (e.g. trace impurities) which constitute non-AOM contaminates. The peaks to be discussed below involve those which are unique to the products being analyzed and can be used to distinguish one product from another. The profile 100 of X-AOM was generated at Iowa State University in Ames, Iowa (USA) using the following type of Raman spectral analyzer: Spex Triplemate Model 1877 produced by Instruments, SA of Edison, N.J. (USA). As illustrated in FIG. 2, the spectral profile of X-AOM includes three main peaks as follows (with the term "main peaks" denoting peaks for a given AOM isomer which are not present in the Raman spectral profiles of other AOM isomers): (1) Peak #1 shown at reference number 102=953–955 cm$^{-1}$; (2) Peak #2 shown at reference number 104=946–948 cm$^{-1}$; and (3) Peak #3 shown at reference number 106=796–798 cm$^{-1}$. These values are expressed in ranges to account for a minor degree of experimental variation which exists between individual Raman spectral analyzers (e.g. from one type or brand to another). The Raman spectral profile 100 of FIG. 2 is entirely distinctive compared with the Raman data obtained from the α-AOM and β-AOM isomers (discussed below), with peaks 102, 104, and 106 being absent from the profiles described below. Thus, X-AOM represents a new and distinctive compound which is structurally different from other AOM isomers.

Figure 3:
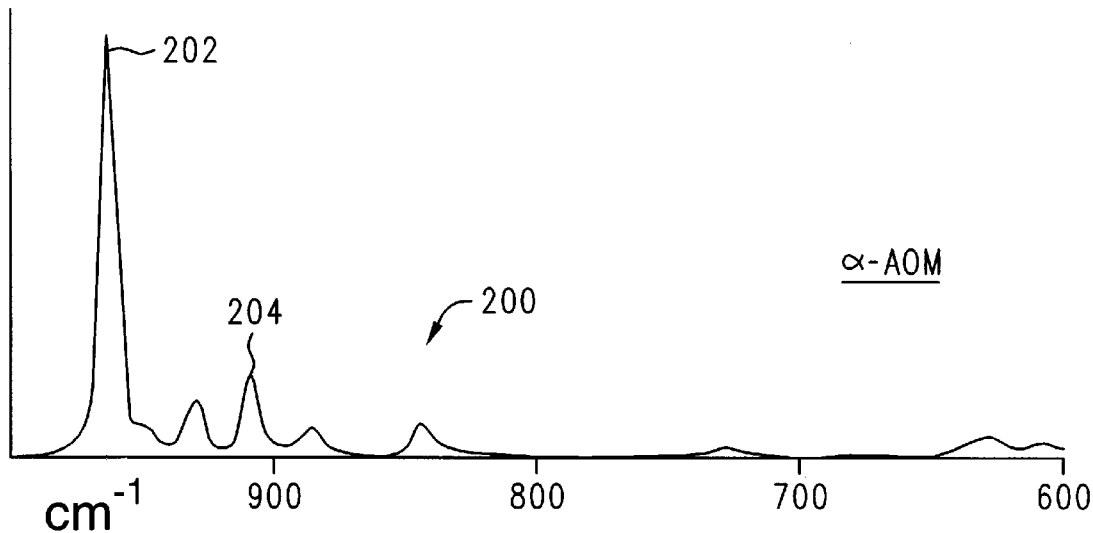
FIG. 3 is a Raman spectral profile of conventional α-AOM which is significantly different from the Raman spectral profile of X-AOM presented in FIG. 2.

FIG. 3 involves a Raman spectral profile 200 of α-AOM. The spectral profile 200 was generated using the same equipment and parameters that were employed in producing the spectral profile 100 of FIG. 2. As illustrated in FIG. 3, the spectral profile 200 of α-AOM includes only two main peaks as follows: (1) Peak #1 shown at reference number 202=964–965 cm$^{-1}$; and (2) Peak #2 shown at reference number 204=910–911 cm$^{-1}$. Comparing FIGS. 2 and 3, the number of peaks and the magnitudes/locations of the peaks are significantly different. Also, peaks 202, 204 are not present in FIG. 2. In accordance with the sensitive and accurate nature of Raman spectroscopy, the significant differences between X-AOM and α-AOM are clearly demonstrated using the information presented above which supports the novelty of X-AOM.

Figure 4:
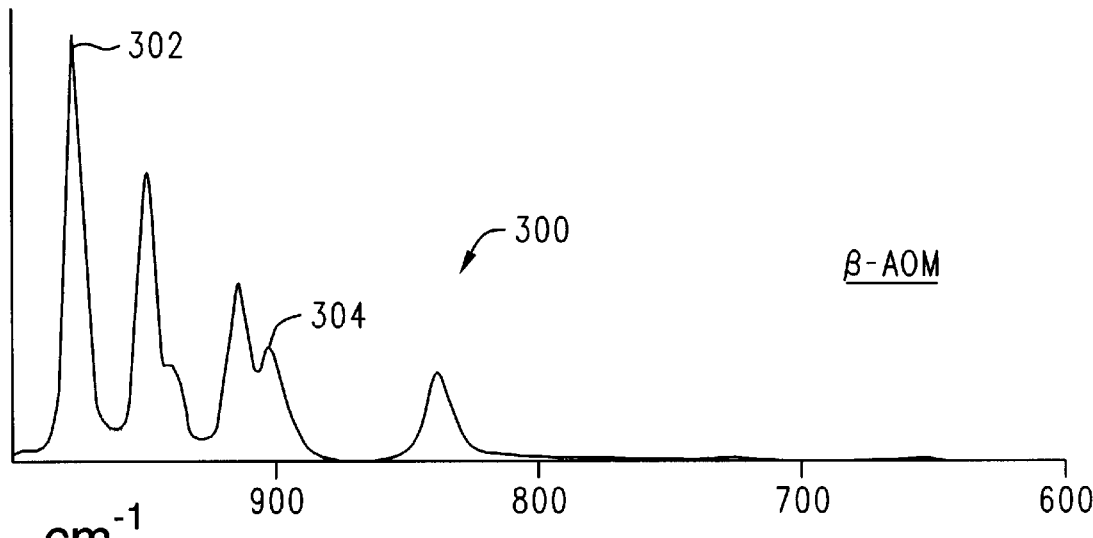
FIG. 4 is a Raman spectral profile of conventional β-AOM which is significantly different from the Raman spectral profile of X-AOM presented in FIG. 2.

Finally, in FIG. 4, a Raman spectral profile 300 of β-AOM is provided. The spectral profile 300 was generated using the same equipment and parameters that were employed in producing the spectral profile 100 of FIG. 2. As illustrated in FIG. 4, the spectral profile 300 of β-AOM includes only two main peaks as follows: (1) Peak #1 shown at reference number 302=977–978 cm$^{-1}$; and (2) Peak #2 shown at reference number 304=900–901 cm$^{-1}$. Comparing FIGS. 2 and 4, the number of peaks and the magnitudes/locations of the peaks are significantly different. Also, peaks 302, 304 are not present in FIG. 2. In accordance with the sensitive and accurate nature of Raman spectroscopy, the significant differences between X-AOM and β-AOM are likewise demonstrated using the information presented above which again supports the novelty of X-AOM.

It is readily apparent that the process discussed herein creates a new, unique, and distinctive form of ammonium octamolybdate which likewise has improved functional capabilities. This is especially true in connection with the superior smoke suppressant capacity of X-AOM compared with other AOM isomers including α-AOM. It has again been determined in various applications that effective smoke suppression will occur using reduced amounts of X-AOM as an additive to, for example, polymer plastics, compared with conventional α-AOM and β-AOM. The X-AOM product is also characterized by high levels of uniformity and purity. Thus, X-AOM has a greater degree of functional efficiency in accordance with the different structural characteristics of this material relative to other AOM isomers.

In conclusion, the claimed product and process collectively represent an important development in molybdenum technology. The X-AOM composition described above not only includes a unique isomeric structure (which is different from all other AOM isomers), but likewise has improved smoke suppression qualities. The product and process discussed above are novel, distinctive, and highly beneficial from a technical and utilitarian standpoint. Having herein set forth preferred embodiments of the present invention, it is anticipated that suitable modifications can be made thereto which will nonetheless remain within the scope of the invention. For example, the claimed process shall not be restricted to any particular operational parameters, processing equipment, and the like unless otherwise noted herein. The invention shall therefore only be construed in accordance with the following claims:

The invention that is claimed is:

1. An ammonium octamolybdate isomer having Raman spectra peaks at wavelength values of about 953–955 $cm^{-1}$, about 946–948 $cm^{-1}$, and about 796–798 $cm^{-1}$.

* * * * *